US010317225B2

(12) United States Patent
Healey et al.

(10) Patent No.: US 10,317,225 B2
(45) Date of Patent: Jun. 11, 2019

(54) INTELLIGENT ROUTE PLANNING

(71) Applicants: Jennifer A. Healey, San Jose, CA (US); Alexandra C. Zafiroglu, Portland, OR (US); Tim Plowman, Berkeley, CA (US); Helen A. Gould, Portland, OR (US); Philip J. Corriveau, Forest Grove, OR (US)

(72) Inventors: Jennifer A. Healey, San Jose, CA (US); Alexandra C. Zafiroglu, Portland, OR (US); Tim Plowman, Berkeley, CA (US); Helen A. Gould, Portland, OR (US); Philip J. Corriveau, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 1247 days.

(21) Appl. No.: 13/631,164

(22) Filed: Sep. 28, 2012

(65) Prior Publication Data
US 2014/0095069 A1 Apr. 3, 2014

(51) Int. Cl.
*G06Q 10/04* (2012.01)
*G01C 21/34* (2006.01)
*G01C 21/36* (2006.01)

(52) U.S. Cl.
CPC ....... *G01C 21/3453* (2013.01); *G01C 21/343* (2013.01); *G01C 21/362* (2013.01); *G06Q 10/047* (2013.01)

(58) Field of Classification Search
CPC .............. G01C 21/3453; G01C 21/343; G01C 21/362; G06Q 10/047

(Continued)

(56) References Cited

U.S. PATENT DOCUMENTS

2004/0073490 A1* 4/2004 Shah ................ G06Q 10/08
705/26.1
2004/0117246 A1* 6/2004 Applebaum ........... G01C 21/26
705/14.5

(Continued)

FOREIGN PATENT DOCUMENTS

KR 10-2007-0075435 A 7/2007
KR 10-2010-0032729 A 3/2010

(Continued)

OTHER PUBLICATIONS

International Search Report and Written Opinion Received for Patent Application No. PCT/US2013/048405, dated Oct. 7, 2013, 14 pages.

*Primary Examiner* — Charles J Han
(74) *Attorney, Agent, or Firm* — Eversheds Sutherland (US) LLP

(57) ABSTRACT

The present disclosure relates to computer-implemented methods and systems for intelligent route planning. An example method may include receiving, by a computation system comprising one or more processors, one or more tasks. The one or more tasks may be associated with one or more locations. The method may further include storing, by the computation system, the one or more tasks. The method may further include receiving, by the computation system, current location information associated with a user. The method may further include generating, by the computation system, based upon the one or more tasks and the current location information, one or more notifications associated with at least one task for presentation to the user.

21 Claims, 11 Drawing Sheets

(58) Field of Classification Search
USPC .................................................. 701/408, 526
See application file for complete search history.

(56) References Cited

U.S. PATENT DOCUMENTS

| | | | |
|---|---|---|---|
| 2007/0038467 A1* | 2/2007 | Honeyager | G06Q 30/00 705/313 |
| 2009/0177383 A1* | 7/2009 | Tertoolen | G01C 21/3682 701/532 |
| 2010/0214083 A1* | 8/2010 | McNay | B60R 25/25 340/426.1 |
| 2011/0208423 A1* | 8/2011 | Haleem | G01C 21/343 701/408 |
| 2012/0143501 A1* | 6/2012 | Tang | G01C 21/3476 701/465 |

FOREIGN PATENT DOCUMENTS

| | | |
|---|---|---|
| KR | 10-2010-0037488 A | 4/2010 |
| KR | 10-2010-0085749 A | 7/2010 |
| WO | 2010/045976 A1 | 4/2010 |

* cited by examiner

INTELLIGENT ROUTE PLANNING

TECHNICAL FIELD

The present disclosure generally relates to vehicle route planning systems, and, in particular, to intelligent systems and methods for vehicle route planning based on one or more user tasks.

BACKGROUND

Computer-driven route planning systems are used every day to assist users in locating and navigating to desired locations such as buildings, addresses, or any other points of interest. Route planning systems typically include a Global Positioning System (GPS) receiver, which enables determining a current geographical location of the user such that it can be flagged on a digital map. The route planning systems, also known as navigational systems, are widely used in vehicles. A route planning system may be implemented as a stand-alone device or as part of an in-vehicle computation system or a smart phone. The route planning system may include an interface for display of a digital map to a user. Typically, routes generated by the route planning system are displayed as an overlaying layer over the digital map so that the user can view his current position on the map as well as a route to a desired location.

In operation, the user may enter one or more desired locations into the route planning system, and, in response, the route planning system will calculate an optimal route, which the user can follow to visit one or more desired locations in a time-efficient manner. However, conventional route planning systems are unable to generate routes based, on user tasks without being provided specific locations.

SUMMARY OF THE DISCLOSURE

The present disclosure relates to computer-implemented methods and systems for intelligent route planning. According to one or more embodiments of the disclosure, a method is provided. The method may include receiving, by a computation system comprising one or more processors, one or more tasks. The one or more tasks can be associated with one or more locations. The method may further include storing, by the computation system, the one or more tasks. The method may further include receiving, by the computation system, current location information associated with a user. The method may further include generating, by the computation system based upon the one or more tasks and the current location information, one or more notifications of at least one task for presentation, to the user.

According to one or more further embodiments of the disclosure, another method is provided. The method may include receiving, by a computation system comprising one or more processors, one or more tasks from one or more users. The method may further include storing, by the computation system, the one or more tasks. The method may further include receiving, by the computation system, current location information. The method may further include receiving, by the computation system, destination information associated with a user. The method may further include generating, by the computation system based upon the one or more tasks and the destination information, at least one route associated with at least one task for presentation to the user.

According to one or more additional embodiments of the disclosure, another method is provided. The method may include receiving, by a computation system comprising one or more processors, one or more tasks from one or more users. The one or more tasks can be associated with one or more locations. The method may further include storing, by the computation system, the one or more tasks. The method may further include receiving, by the computation system, current location information. The method may further include receiving, by the computation system, historical route information associated with the current location information. The method may further include generating one or more notifications of at least one task for presentation to the user based on the historical route information and the one or more tasks.

According to another embodiment of the disclosure, a system is provided. The system may include a computation device comprising one or more processors. The one or more processors can be configured to receive one or more tasks associated with one or more locations. The one or more processors can be further configured to store the one or more tasks. The one or more processors can be further configured to receive current location information associated with a user. The one or more processors can be further configured to generate one or more notifications of at least one task for presentation to the user based upon the one or more tasks and the current location information. The one or more processors can be further configured to provide, to the user, at least one route associated with the at least one task. The one or more processors can be further configured to receive a user selection of the at least one route associated with the at least one task. The one or more processors can be further configured to navigate the user to at least one location, associated with the at least one task. The one or more processors can be further configured to notify, upon completion of the at least one task, the one or more users of the completion of the at least one task.

According to another embodiment of the disclosure, a non-transitory processor-readable medium is provided. The non-transitory processor-readable medium can have embodied thereon instructions being executable by at least one processor to perform a method. The method may include receiving, by a computation system comprising one or more processor or more processors, one or more tasks. The method may further include storing, by the computation system, the one or more tasks. The method may further include receiving, by the computation system, current location information associated with a user. The method may further include generating, by the computation system based upon the one or more tasks and the current location information, one or more notifications of at least one task for presentation to the user.

Other example embodiments of the disclosure and aspects will become apparent from the following description taken in conjunction with the following drawings.

BRIEF DESCRIPTION OF THE DRAWINGS

Reference will now be made to the accompanying figures and diagrams, which are not necessarily drawn to scale, and wherein.

DETAILED DESCRIPTION

Figure 1:
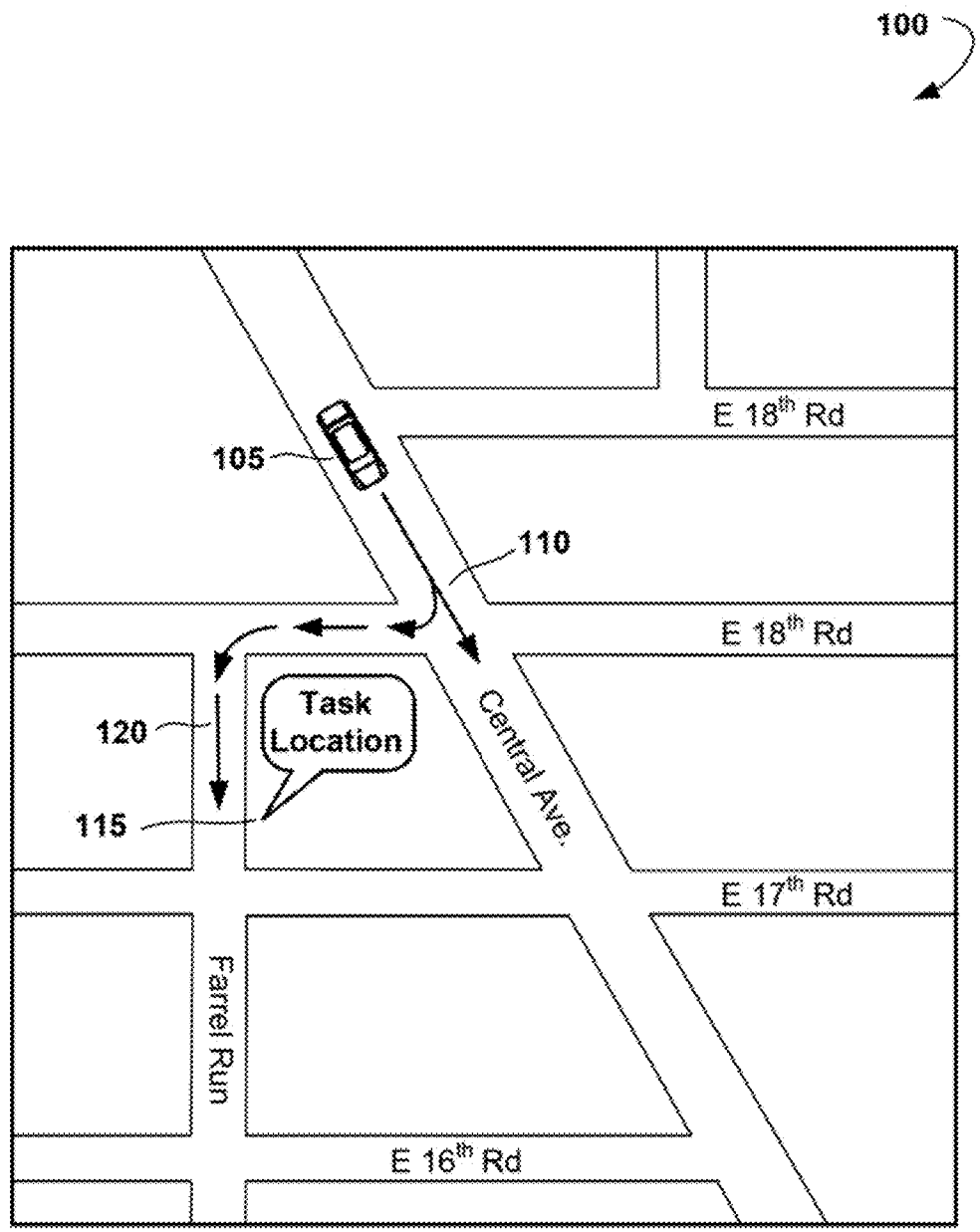
FIG. 1 is a digital map showing a current location of a user and possible routes, according to an example embodiment.

In the following description, numerous specific details are set forth. However, it should be understood that embodiments of the present disclosure may be practiced without these specific details. In other instances, well-known methods, structures, and techniques have not been shown in detail in order not to unnecessarily obscure this description. References to "one embodiment," "an embodiment," "example embodiment," "various embodiments," and so forth indicate that the embodiment(s) of the present disclosure so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified, the use of the ordinal adjectives "first," "second," "third," and so forth, to describe a common object, merely indicates that different instances of like objects are being referred to and are not intended to imply that the objects so described must be in a given sequence, either temporally, spatially, in ranking, or in any other manner.

As used herein, the term "vehicle" may refer generally to an automobile, motorcycle, car, truck, passenger vehicle, bus, and the like.

As used herein, unless otherwise specified, the term "mobile device" refers, in general, to a wireless communication device, and more particularly to one or more of the following: a portable electronic device, a telephone (e.g., cellular phone, smart phone), a computer (e.g., laptop computer, tablet computer), a portable media player, a personal digital assistant (PDA), or any other electronic device having a networked capability.

As used herein, unless otherwise specified, the term "in-vehicle computation system" may refer to an in-vehicle computing device, navigational system for use in a vehicle, vehicle infotainment system, or any other similar system or device.

According to one or more embodiments, the mobile device and/or the in-vehicle computation system may determine their current location by processing satellite navigation data such as, for example, Global Positioning System (GPS) data or navigation data from any other satellite navigational system. Alternatively, the location may be determined by processing multilateration data associated with the user mobile device. The multilateration location determination may be based on auxiliary data received from cellular network base stations, web servers, network routers, and so forth.

According to one or more embodiments, the present disclosure is related to intelligent route planning technology. In general, this technology involves route generation based on one or more user tasks or errands. The user tasks may include any action to be performed by the user at a geographical location or at a type of business associated with one or more geographical locations. Some examples of user tasks may include buying pet food, picking up clothes at dry cleaners, sending mail at a post office, visiting a drug store to buy medicine, and so forth. The user tasks may have an occasional nature, although some tasks may be repeated over a period of time. In some embodiments, the tasks may be associated with timing information such as a time of day, date and/or one or more time periods within the tasks are to be completed. In this regard, the tasks can be linked to a digital calendar or otherwise associated with digital calendars.

According to one or more embodiments, the user may have one or more tasks entered or digitally transmitted to one or more of the following: a mobile device, an in-vehicle computation system, or a central (remote) server. More specifically, in an example embodiment, the user associated with a mobile device, such as a smart phone, may have a dedicated software application enabling the user to store one or more tasks. The tasks may be input using a keypad, a touchscreen or selected from a list of predetermined tasks, or by using voice commands.

In one example embodiment, the user may input tasks via an in-vehicle computation system. With the in-vehicle computation system, the tasks may be input via a keypad, a touchscreen or be provided as voice commands.

In one example embodiment, the user may use a computer or mobile device to input tasks into a central server such as an application server. To this end, the user may visit a dedicated website or use an ad hoc mobile application installed onto the computer or mobile device.

According to one or more example embodiments, the tasks input in one of the devices can be transmitted to another device. This transmission may be performed automatically or after receiving special instructions from the user. For example, once one or more tasks are input by the user into the mobile device, the mobile device may send the one or more tasks to the central server over a communications network. In another example, provided the mobile device has one or more tasks previously stored by the user, the tasks may be transmitted to the in-vehicle computation system as the mobile device comes into proximity of the in-vehicle computation system or when the in-vehicle computation system is powered by the vehicle ignition system.

Similarly, the described process may proceed in an opposite direction, when the tasks are transmitted from the in-vehicle computation system (in other words "synchronized") to the mobile device and/or the central server.

In one example embodiment, both the mobile device and the in-vehicle computation system may transmit newly input tasks to the central server once the tasks are provided by the user. Furthermore, any time the mobile device or the in-vehicle computation system is powered (unlocked), the mobile device or the in-vehicle computation system it may be determined at the central server whether any new user tasks are provided, and if so, the new tasks may be downloaded from the mobile device or the in-vehicle computation system.

In other words, the mobile device, the in-vehicle computation system, and the central server may be in constant or periodic communication with each other to synchronize user tasks.

Below is provided a detailed description, of various embodiments with reference to accompanying drawings.

According to one or more embodiments of the present disclosure, a mobile device and/or the in-vehicle computation system may repeatedly determine a current geographical location of the user traveling with a mobile device and/or in a vehicle having a computation system. The mobile device and/or the in-vehicle computation system may track movement of the user by mapping geographical location data of the mobile device and/or vehicle (i.e., the in-vehicle computation system) over a period of time. The user movement may be associated with a digital map stored in the mobile device and/or the in-vehicle computation system. Accordingly, user path along streets, squares, roads, and so forth can be mapped. The mobile device and/or in-vehicle computation system may further determine if any of pre-stored user tasks may be implemented by the user based on determination that the current location of the user (e.g., the current location of the mobile device and/or vehicle) is proximate to at least one location associated with at least one of the pre-stored user tasks. In some embodiments, not only the current location of the user (e.g., the current location of the mobile device and/or vehicle), but also a recent user travel path or travel direction may be taken into consideration when determining whether it would be convenient for the user to complete one or more tasks.

Furthermore, once it is determined that one or more tasks may be potentially completed by the user, one or more corresponding notifications may be generated and presented to the user. The notifications may be generated by either the mobile device or the in-vehicle computation system. In some example embodiments, once the notifications are generated by the in-vehicle computation system, the notifications may be transmitted to the mobile device, or vice versa. The notifications may also be generated by the central server and transmitted to the mobile device or the in-vehicle computation system, or vice versa.

The notifications may be presented to the user in a number of different ways. For example, the notifications may be displayed on a display of the mobile device or on a display of the in-vehicle computation system. The notification may be displayed as a text message, image, video, animation, and so forth. In another example, the notifications may be played as an audio message via the speakers of the mobile device, vehicle speakers, or speakers of the in-vehicle computation system. In yet other examples, the notifications may be provided to the user as a mechanical signal such as vibration of the mobile device or the like. The notifications may include one or more of the following: an audio signal, an audio reminder, a digital message, an audible signal, a visual signal, a video message, multimedia message, or a mechanical signal. Furthermore, the notifications may be presented repeatedly as "reminders". For example, the notifications may be presented to the user every hour, day, week, and so forth.

According to one or more embodiments of the present disclosure, the tasks may be associated with two or more users. For example, each adult from the same family may be "recognized" by an in-vehicle computation system, and based on this recognition, the tasks input or received by the in-vehicle computation system may be differentiated. To this end, the in-vehicle computation system may include user recognition hardware and/or related software components. In an example, there may be provided at least one video camera communicatively coupled to the in-vehicle computation system so that the in-vehicle computation system can perform face recognition to determine (and optionally authenticate and validate) one or more users. Alternatively, the in-vehicle computation system may recognize a particular user by processing his voice or speech, in yet another example, the in-vehicle computation system may recognize a particular user based on communications with his mobile device. In other words, by differentiating between the mobile devices associated with two or more users, the in-vehicle computation system can differentiate between the users. It yet another example, the in-vehicle computation system may prompt the users to input a password, credentials, personal identification code (PIN) or make another input via a keypad or touchscreen to recognize the users. Those skilled in the art will appreciate that any suitable user recognition technology can be used including biometrics-based technologies. The biometrics-based technologies may include recognition/authenticating algorithms based on processing of images (e.g., face images, retina, iris, fingerprints), processing audio (e.g., voice, speech), biosigns (e.g., electrical resistance of skin areas, electrical or electromagnetic parameters of user body), behavioral parameters (e.g., keystroke dynamics, gestures), and so forth.

Furthermore, the in-vehicle computation system may determine (recognize) not only the driver, but also one or more passengers. Once the driver and one or more passengers are recognized, the in-vehicle computation system can determine (or retrieve from an internal memory, one or more mobile devices, or the central server) one or more tasks associated with the driver and the one or more passengers. Accordingly, the notifications may be generated and presented to the user with respect to the tasks of both the driver and the one or more passengers.

Some restrictions can be imposed before the notifications are generated based on policies and corresponding user profiles. Some policies may restrict generation of notifications based on a particular time, date, travel route, travel direction, vehicle speed, presence of certain users in the vehicle, and so forth. For example, if the tasks include buying an alcoholic beverage, a corresponding notification may only be generated and presented to the driver if the driver is legally able to buy alcohol.

According to one or more embodiments of the present disclosure, the tasks may be flagged, indicated, or marked as complete. This information may be stored in the mobile device, in-vehicle computation system and/or central server. The tasks may be indicated as complete by the users by making a corresponding input or providing a voice command. In one example, one of the mobile devices, the in-vehicle computation system or the central server may automatically determine that the user vehicle visited a location associated with a particular task, and thus one of these devices may assume that the task is complete. In this case, the mobile device and/or the in-vehicle computation system will prompt the user to confirm that the particular task is indeed complete. It should be also mentioned that the information about completeness of tasks may also be transmitted from one device to another, i.e. from the mobile device to the in-vehicle computation system and/or the central server, or vice versa.

As mentioned above, the users may have user profiles. These profiles may be stored, for example, in the central server so that any of the mobile devices and the in-vehicle computation system may access the profiles over a communications network such as a cellular network or the Internet. In general, the profiles may include user personal information including a user name, a user photo, one or more user tasks, information about complete tasks, typical travel routes, passwords, credential information, addresses (such as a home address, work address, points of interest addresses), biometric information, and so forth. The user profiles may be further used for user recognition and user authentication.

Figure 2:
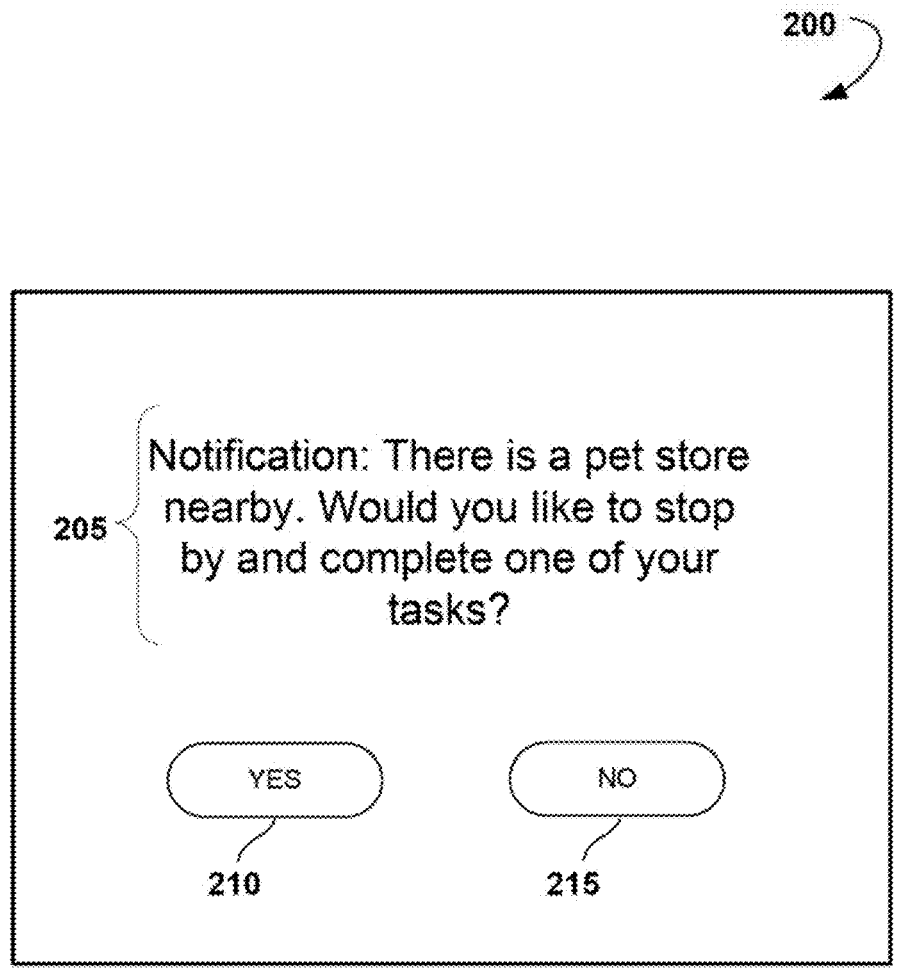
FIG. 2 is a graphical interface displayable on a display screen of an in-vehicle computation system illustrating a push notification, according to an example embodiment.

Referring now to the drawings, FIG. 1 shows an example digital map 100 having a current location pictogram 105 of the user. The user can travel in the vehicle in the direction shown by an arrow 110. Once the in-vehicle computation system determines that the vehicle is in proximity of a task location 115 associated with at least one user task (e.g., it is determined that the vehicle is within a predetermined radius or some other range from the location 115), the in-vehicle computation system may generate a push notification. The notification may be played back as an audio message and/or displayed on a display screen of the in-vehicle computation system. FIG. 2 shows an example graphical interface 200 of the in-vehicle computation system illustrating a push notification for the user. The push notification may include a text section 205 and one or more clickable buttons 210, 215 which can be used to decline or accept the task. If the user accepts the task, the in-vehicle computation system may generate one or more new routes to a location associated with the selected task. The new routes may be then displayed on the display screen of the in-vehicle computation system and the in-vehicle computation system may optionally navigate the user to the location 115. In the example illustrated by FIG. 1, the new route to the location 115 may be displayed for the user as a route 120.

Figure 3:
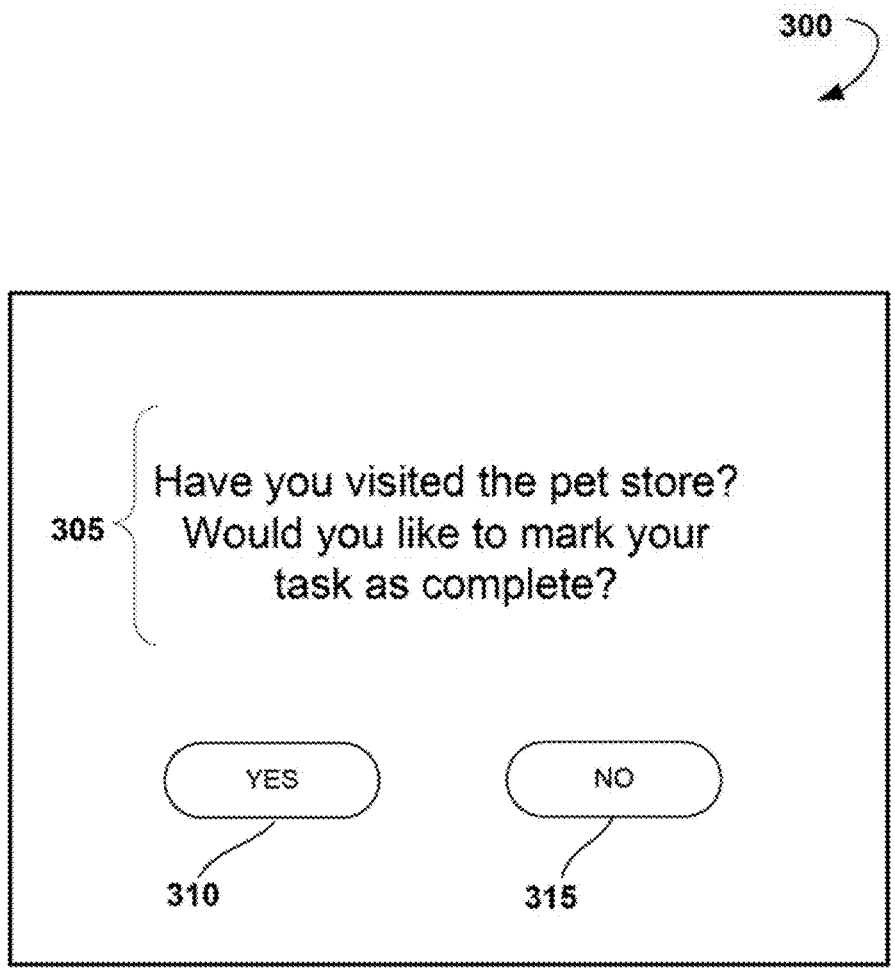
FIG. 3 is a graphical interface displayable on a display screen of an in-vehicle computation system to prompt a user to indicate one or more tasks as complete, according to an example embodiment.

According to one or more embodiments, once the user vehicle visits the location 115 associated with the task, the user can be prompted by the in-vehicle computation system to indicate the task as complete. FIG. 3 shows an example graphical interface 300 displayable on the display screen of the in-vehicle computation system to prompt the user to indicate the task as complete. The graphical interface 300 may include a text section 305 and one or more clickable buttons 310, 315 to confirm or decline that the task is complete.

According to one or more embodiments, the tasks generated by the user(s) may have different priority levels. For example, the user may mark his tasks as urgent or non-urgent. Alternatively, the tasks may be assigned ratings, ranks, or weights. For example, the tasks may have priorities from 1 to 5, wherein higher priorities indicate more urgent tasks. The priority of the task may dictate how notifications are generated and presented to the user. For example, the notifications may be generated and presented to the user as a list of tasks sorted based on the task priorities. In addition, once it is determined that the user vehicle is within a predetermined distance from a location associated with a particular task, such predetermined distances can be longer for urgent tasks as opposed to non-urgent tasks. Furthermore, notifications related to urgent tasks may be presented to the user more frequently than notifications for non-urgent tasks. Further, notifications related to urgent tasks and notifications related to non-urgent tasks may be presented to the user using differing formats of text messages, audio messages, images, videos or animations.

Figure 4:
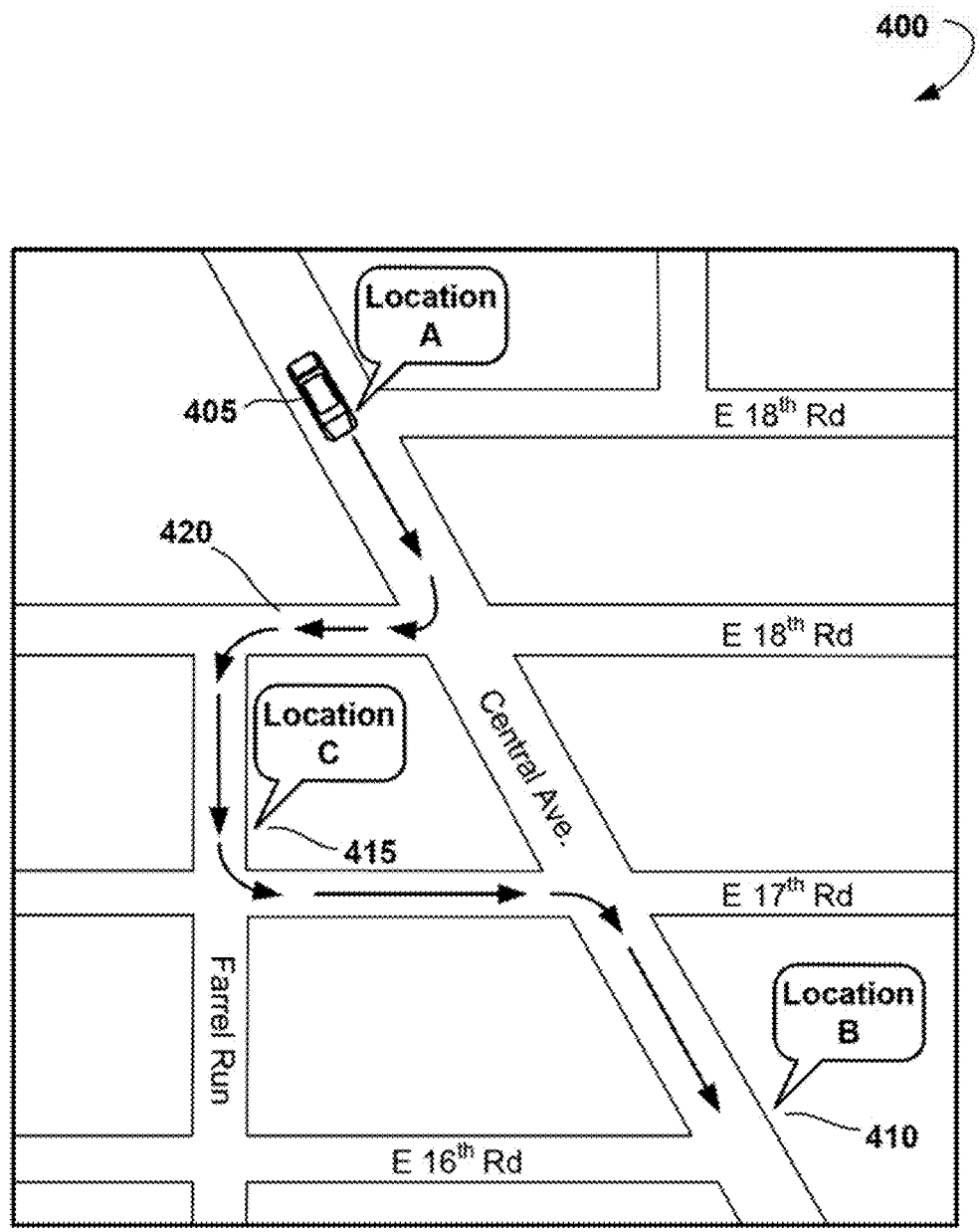
FIG. 4 is an example digital map illustrating a current location, of a user, a destination location, and a possible route, according to an example embodiment.

According to one or more embodiments of the present disclosure, notifications associated with one or more user tasks may be presented to the user when the user uses the in-vehicle computation system to navigate to a particular destination. More specifically, the user may utilize the in-vehicle computation system to navigate him from a current geographical location (location "A") to a desired destination location "B". FIG. 4 shows an example digital map 400 illustrating a current location pictogram 405 of the user vehicle and a pictogram 410 of the destination location "B".

Furthermore, the in-vehicle computation system may retrieve one or more tasks associated with the user. As discussed above, the user tasks may be stored in and retrieved from the in-vehicle computation system, mobile device or central server. The in-vehicle computation system may then generate one or more routes to the desired destination location "B" (i.e., from the location "A" to the location "B") through one or more locations associated with the one or more tasks of the user. The user may be prompted to select one of the generated routes involving visiting none, one, or more locations associated with the tasks. Once one of the routes is selected by the user, the user may be navigated to the desired destination location "B" via one or more locations associated with the one or more tasks.

In the example shown in FIG. 4, a location associated with a task to be completed by the user is shown as location "C" 415. Accordingly, the in-vehicle computation system, may generate a route from the location "A" 405 to the location "B" 410 via the location "C" 415 using the route 420. Although FIG. 4 shows only one location "C" 415 associated with one or more tasks, it should be clear that there can be two or more locations associated with two or more tasks through which the route 420 is passing.

According to one or more embodiments, the in-vehicle computation system may generate the route 420 based on traffic information. The traffic information can be received by the in-vehicle computation system from a satellite system or from a remote server over a communications network, such as the internet or a cellular network. In particular, the route 420 may be generated such that the user is able to get to the one or more locations as fast as possible. According to one or more embodiments, the in-vehicle computation system may generate two or more routes 420. In this case the user may select one of the generated routes to be navigated towards a destination location via two or more locations associated with the one or more tasks.

According to one or more embodiments, the in-vehicle computation system may generate the route 420 based on one or more of a vehicle speed, current time, current day, driver, presence of passengers in the vehicle, and so forth. For example, if the only user is in the vehicle, the in-vehicle computation system may generate the route 420 as described, but when there are other passengers in the vehicle, the in-vehicle computation system may not generate any routes via the locations associated with one or more tasks or generate those routes differently based, on various settings and/or policies.

The in-vehicle computation system may generate push notifications for the user and present them as audio or displayable messages. In addition, the user may be prompted to set status of one or more tasks as complete so that the notifications are no longer generated for such tasks. The user may set different urgent levels to the tasks, set priorities, establish various policies, rules, and so forth.

According to one or more embodiments of the present disclosure, notifications associated with one or more tasks are generated based on current time and historical route information related to one or more users. Generally speaking, the historical route information may associate a calendar with routes taken by the users' vehicles. In other words, the historical route information may include one or more previously taken routes associated with one or more points of interest (e.g., a home location, work location, grocery store location) and date/time. Every route taken by the user can be stored in a memory of the in-vehicle computation system, the mobile device, or in the central server. The historical route information may be analyzed by one of the devices (the in-vehicle computation system, the mobile device, or the central server) to generate one or more notifications.

The present technology may allow monitoring routes of the user vehicle taken on a regular basis and analyze them to determine user most popular routes, times of travel, and so forth. For example, it may be noted that the user gets into his vehicle every day at about 8:00 a.m. and drives to work using a certain route. Based on this historical route information, the in-vehicle computation system may generate notifications, which include suggestions to perform one or more tasks associated with locations along the route. The user may be prompted to select one of the tasks and/or corresponding new routes via the locations associated with the selected tasks to the desired destination location (e.g., work). In the provided example, the in-vehicle computation system may determine time/date when the user gets into the car and anticipates his typical route based on the historical route information. If there are any pending tasks, the user may be prompted to select one or more tasks associated with locations within a predetermined range of the anticipated route.

The in-vehicle computation system may generate notifications for the user and present them as audio or displayable messages. In addition, the user may be prompted to set status of one or more tasks as complete so that the notifications are not generated for such tasks. The tasks can be prioritized, ranked, and one or more corresponding settings or policies may be applied.

Figure 5:
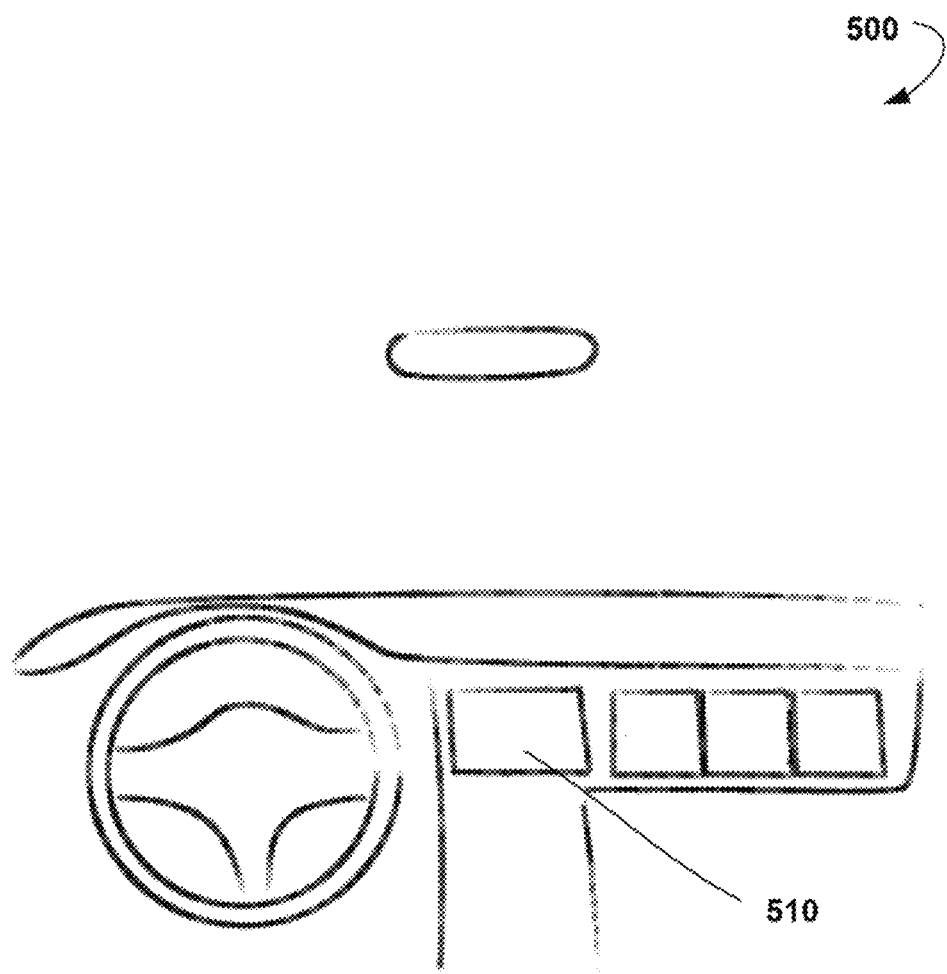
FIG. 5 is a dashboard of a vehicle having an integrated in-vehicle computation system, according to an example embodiment.

FIG. 5 shows an example dashboard 500 of a vehicle having an in-vehicle computation system 510. In this figure, the in-vehicle computation system 510 is schematically shown as a display located on the vehicle dashboard 500 such that one or more users (e.g., the driver and one or more passengers) may see the display. The display may display digital maps, routes, travel suggestions, notifications, reminders, tasks, and so forth. Furthermore, the display may include a keypad or a touchscreen enabling the users to make inputs including tasks, selection of routes, selection of completed tasks, and so forth. Other components of the in-vehicle computation system 510 will be provided below with reference to FIG. 8.

Figure 6:
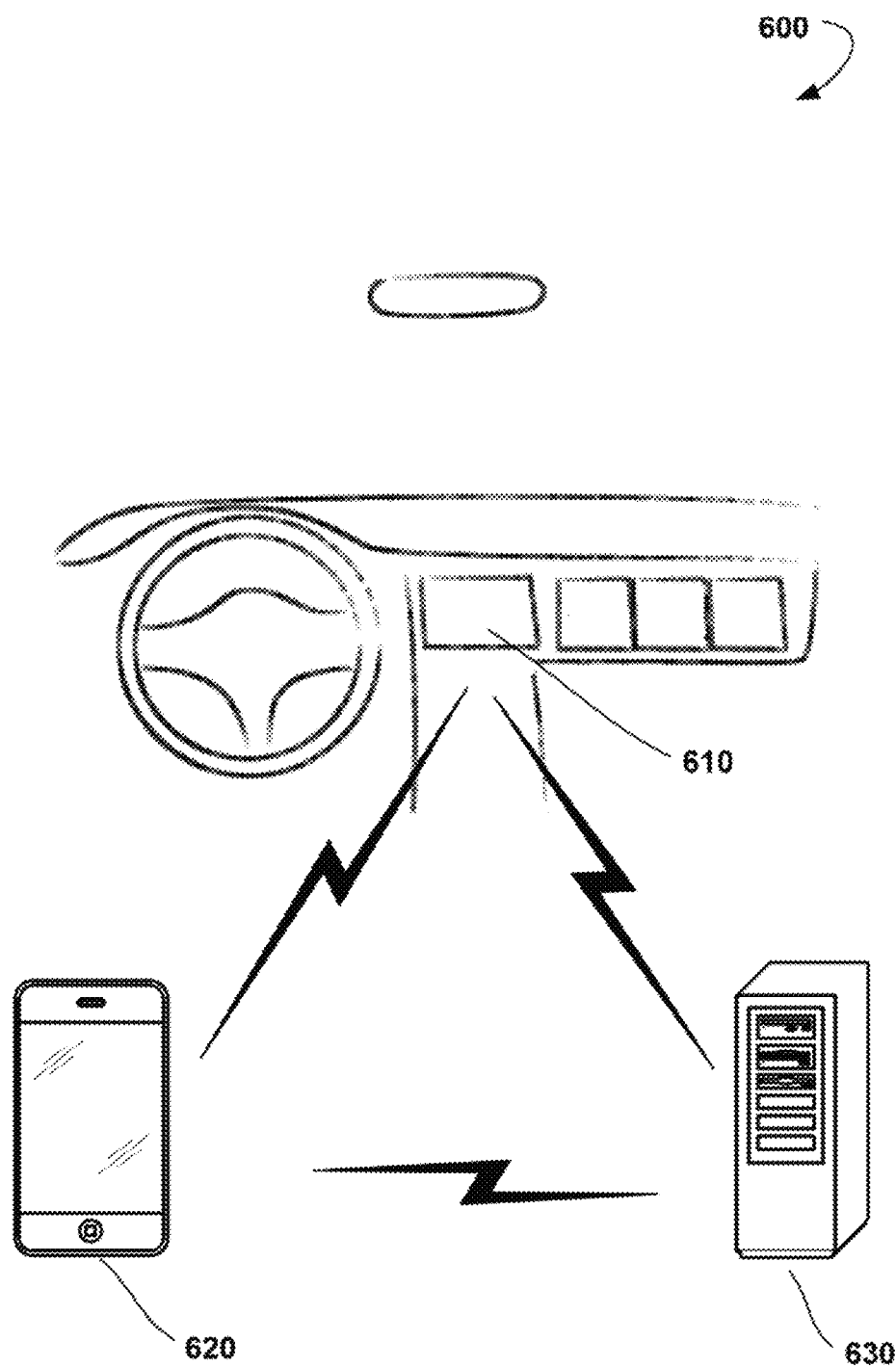
FIG. 6 is a dashboard of a vehicle having an integrated in-vehicle computation system shown in communication with a mobile device and a server, according to an example embodiment.

FIG. 6 shows an example dashboard 600 of a vehicle having an in-vehicle computation system 610 in communication with a mobile device 620 and/or a central server 630. According to one or more embodiments of the present disclosure, the in-vehicle computation system 610 may establish wireless communication with the mobile device 620 to transmit notifications, tasks, routes, reminders, and so forth. Similarly, the in-vehicle computation system 610 may establish wireless communication with the central server 630 to transmit notifications, tasks, routes, reminders, and other data. The wireless communication may include communication using IEEE 802.11 group of standards, such as "Wi-Fi", Bluetooth communication standards, infrared (IR) communication standards, or any other radio or electromagnetic wireless communication standard. The ability to communicate data between each other provides users with greater flexibility. Indeed, the user may use his mobile device 620 to input tasks and corresponding locations, and once the user gets into the vehicle, the mobile device 620 may automatically transmit the tasks to the in-vehicle computation system 610. To this end, the tasks can be displayed on a display screen of the mobile device and a display screen of the in-vehicle computation system 610.

Furthermore, the mobile device 620 may generate notifications and transmit the notification to the in-vehicle computation system 610 such that the notifications can be played using vehicle speakers and/or the display of the in-vehicle computation system 610. In addition, if the user indicates that a particular task is complete via the in-vehicle computation system 610, this information may be transmitted to the mobile device 620 and/or the central server 630. Similarly, if user inputs tasks or other information into the central server 630, the tasks can be automatically sent to the mobile device 620 and/or in-vehicle computation system 610. In this regard, records of these devices and systems may be synchronized in real time so there is no confusion. Those skilled in the art will understand that the tasks input into in-vehicle computation system 610 may be transmitted to the mobile device 620 and/or the central server 630. This approach enables displaying the notifications, reminders, suggestions via the mobile device 620.

Figure 7:
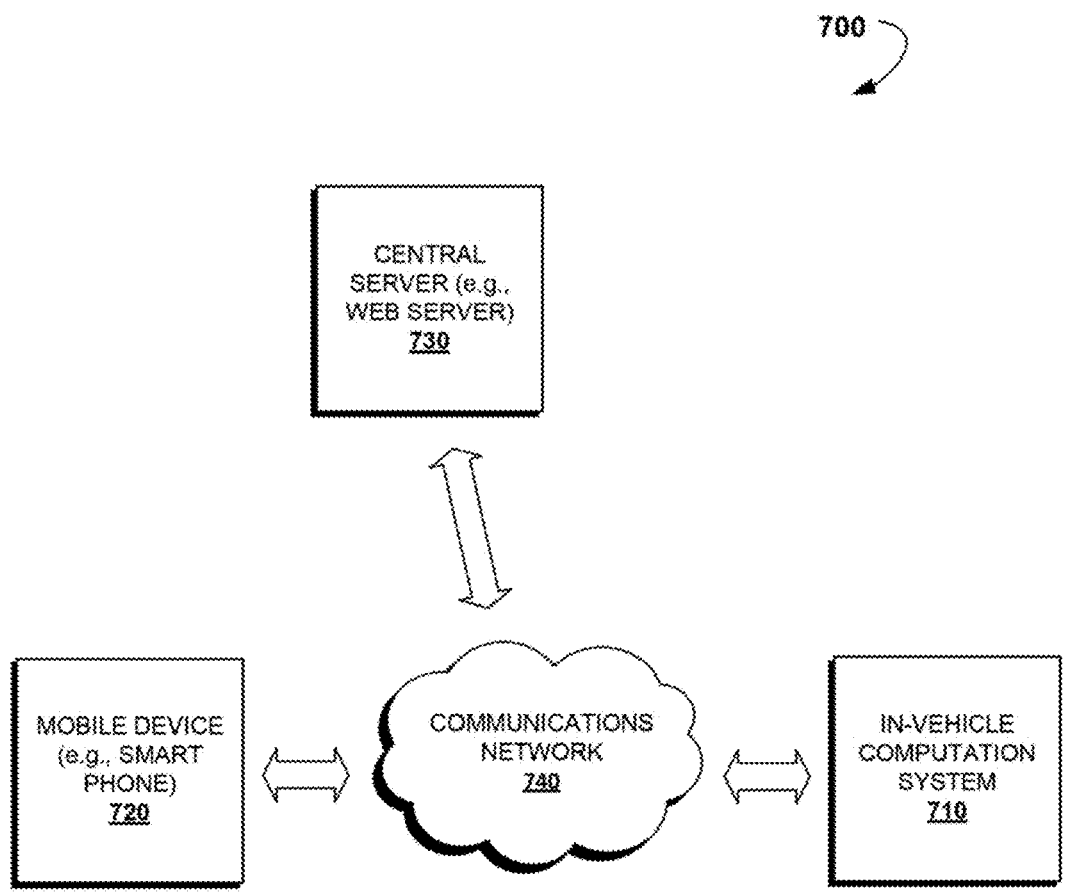
FIG. 7 is an environment suitable for implementing methods for intelligent route planning, according to an example embodiment.

The above principles are further illustrated in FIG. 7, which shows an example environment 700 suitable for implementing methods for intelligent route planning. The environment 700 includes an in-vehicle computation system 710, a mobile device 720 and/or a central server 730. These elements are in communication with each other via a communications network 740.

The communications network 740 is a network of data processing nodes interconnected for the purpose of data communication, which may be utilized to communicatively couple various components of the environment 700. The network 740 may include the Internet or any other network capable of communicating data between devices. Suitable networks may include or interface with any one or more of, for instance, a local intranet, a PAN (Personal Area Network), a LAN (Local Area Network), a WAN (Wide Area Network), a MAN (Metropolitan Area Network), a virtual private network (VPN), a storage area network (SAN), a frame relay connection, an Advanced Intelligent Network (AIN) connection, a synchronous optical network (SONET) connection, a digital T1, T3, E1 or E3 line, Digital Data Service (DDS) connection, DSL (Digital Subscriber Line) connection, an Ethernet connection, an ISDN (Integrated Services Digital Network) line, a dial-up port, such as a V.90, V.34 or V.34bis analog modem connection, a cable modem, an ATM (Asynchronous Transfer Mode) connection, or a FDDI (Fiber Distributed Data Interface) or CDDI (Copper Distributed Data Interface) connection. Furthermore, communications may also include links to any of a variety of wireless networks, including WAP (Wireless Application Protocol), GPRS (General Packet Radio Service), GSM (Global System for Mobile Communication), CDMA (Code Division Multiple Access) or TDMA (Time Division Multiple Access), cellular phone networks, GPS (Global Positioning System), CDPD (Cellular Digital Packet Data), RIM (Research in Motion, Limited) duplex paging network, Bluetooth radio, or an IEEE 802.11-based radio frequency network. The network 740 may further include or interface with any one or more of an RS-232 serial connection, an IEEE-1394 (Firewire) connection, a Fiber Channel connection, an IrDA (infrared) port, a SCSI (Small Computer Systems Interface) connection, a USB (Universal Serial Bus) connection or other wired or wireless, digital or analog interface or connection, mesh or Digi® networking.

It should be also mentioned that practicing of the principles of the present disclosure does not require presence of all mentioned elements. In some embodiments, the methods for intelligent route planning may be practiced using only the mobile device 720 or only in-vehicle computation system 710. In some other embodiments, the methods for intelligent route planning can be practiced using just two of the above described elements. For example, only the mobile device 720 and the in-vehicle computation system 710 can be utilized. Alternatively, only the mobile device 720 and the central server 730 can be utilized. Alternatively, only the in-vehicle computation system 710 and the central server 730 can be utilized. In yet other embodiments, the in-vehicle computation system 710, the mobile device 720 and the central server 730 may be used to practice the technology described herein.

Figure 8:
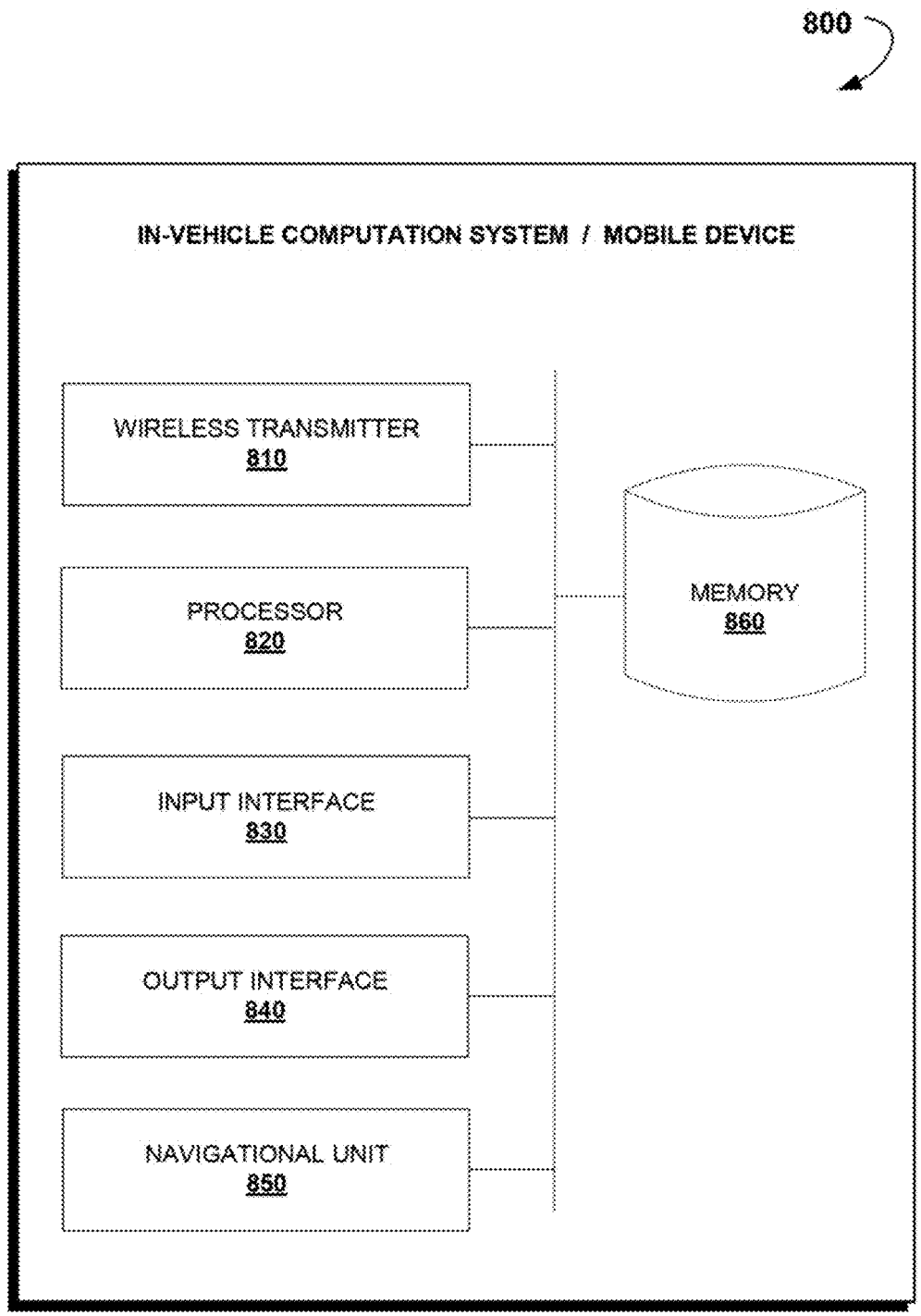
FIG. 8 is an in-vehicle computation system or a mobile device suitable for implementing methods for intelligent route planning, according to an example embodiment.

FIG. 8 shows an in-vehicle computation system or a mobile device suitable for implementing methods for intelligent route planning, according to an example embodiment. As shown in the figure, the system 800 may comprise a wireless transmitter 810, one or more processors 820, an input interface 830, an output interface 840, a navigational unit 850, and a memory 860.

The wireless transmitter 810 may be configured to receive data from a communications network at the system 800 and transmit data from the system 800 to the communications network. In some embodiments, the wireless transmitter 810 can also establish communications between the elements 820-860.

The one or more processors 820 may be configured to perform one or more logic operations related to various methods for intelligent route planning as described herein. For example, the one or more processors 820 may be configured to generate one or more notifications (reminders, suggestions) with respect to at least one user task, generate one or more routes associated with one or more tasks, enable users to mark tasks as complete, notify the users of the completion of one or more tasks, process location information and traffic information to generate or adjust one or more routes, overlay routes over one or more digital maps, rank tasks, prioritize tasks, perform user recognition, voice recognition, and so forth.

The input interface 830 may be configured to enable one or more users to make various inputs. The inputs may include tasks, routes, addresses, locations, user profiles, policies, task rankings, settings, and so forth. The input interface 830 may include one or more of a keypad, a touchscreen, a touchpad, a trackball, a microphone, voice recognition hardware/software, and so forth.

The output interface 840 may be configured to present to one or more users text messages, video messages, images, multimedia messages, audio messages, voice messages, mechanical signals, and so forth. The output interface 840 may include a display such as a light-emitting diode (LED) display, organic light-emitting diode (OLED) display, liquid crystal display (LCD), an electro-phoretic display, and so forth. The output interface 840 may also include speakers and a vibration machine to generate vibrations.

The navigational unit 850 may be configured to determine current location of the system 800. The current location can be determined by receiving and processing signals of a satellite system. Alternatively, the location may be determined by processing multilateration data associated with system 800. The multilateration location determination may be based on auxiliary data received from cellular network base stations, web servers, network routers, and so forth. The navigational unit 850 may provide navigation for the users by generating routes, paths, travel tips, overlaying routes over digital maps, process traffic information, and so forth.

The memory 860 may be configured to store data needed for operation of the system 800, which data may include tasks, notifications, reminders, suggestions, routes, calendar data, traffic data, digital maps, user profiles, settings, policies, and so forth.

Figure 9:
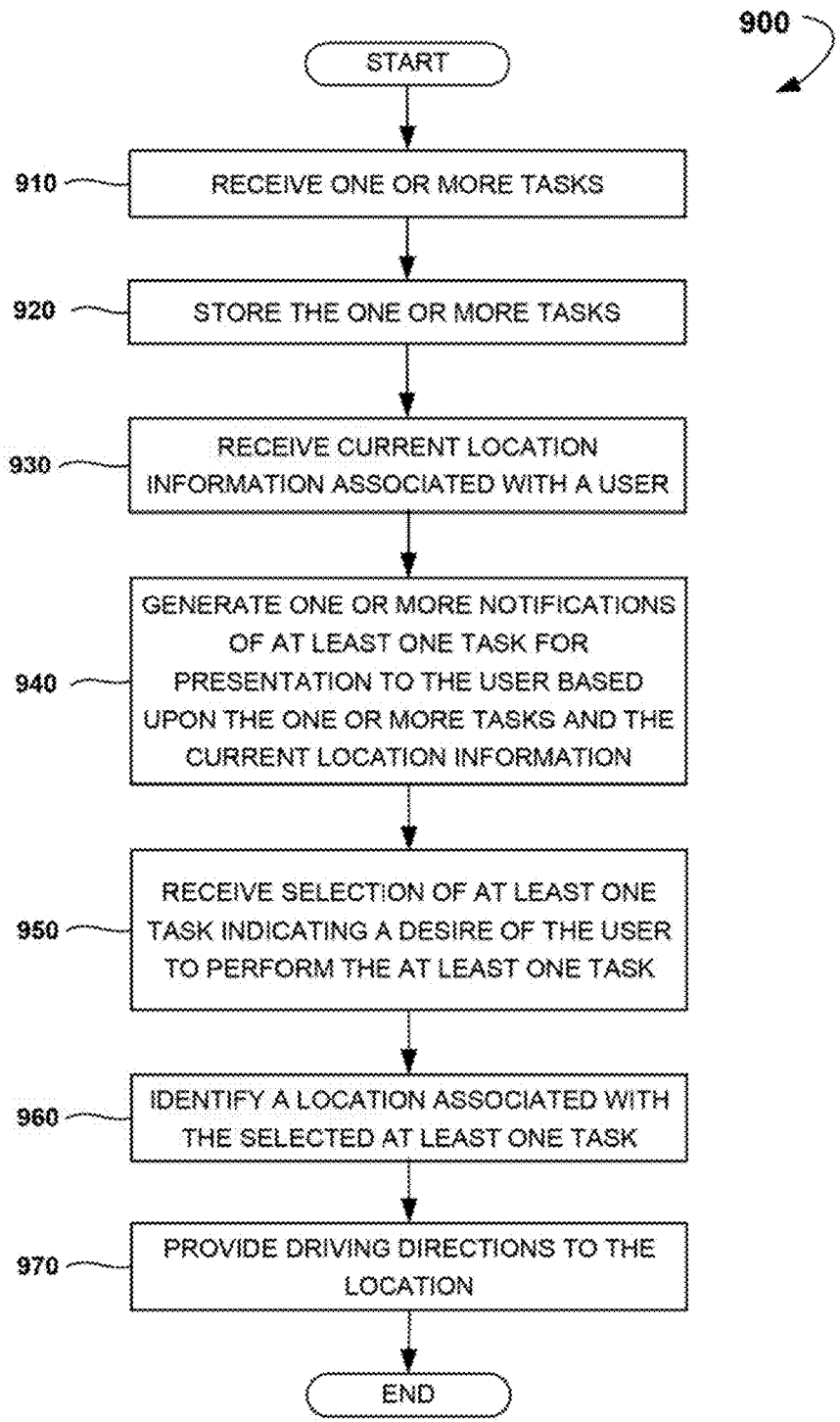
FIG. 9 is a process flow diagram showing a method for intelligent route planning, according to an example embodiment.

FIG. 9 is a process flow diagram showing a method 900 for intelligent route planning, according to an example embodiment. The method 900 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the system 800.

As shown in FIG. 9, the method 900 may commence at operation 910 with the wireless transmitter 810 or the input interface 830 receiving one or more tasks. At operation 920, the one or more tasks may be stored in the memory 860. At operation 930, the wireless transmitter 810 or the navigational unit 850 may receive current location information associated with a user (or current location of the system 800). At operation 940, the one or more processors 820 may generate one or more notifications of at least one task for presentation to the user based upon the one or more tasks and the current location information. At operation 950, the wireless transmitter 810 or the input interface 830 may receive a user selection of at least one task indicating desire of the user to perform the at least one task. At operation 960, the one or more processors 820 may identify a location associated with the selected at least one task. At operation 970, the one or more processors 820 and/or the navigational unit 850 may provide driving directions to the location.

Figure 10:
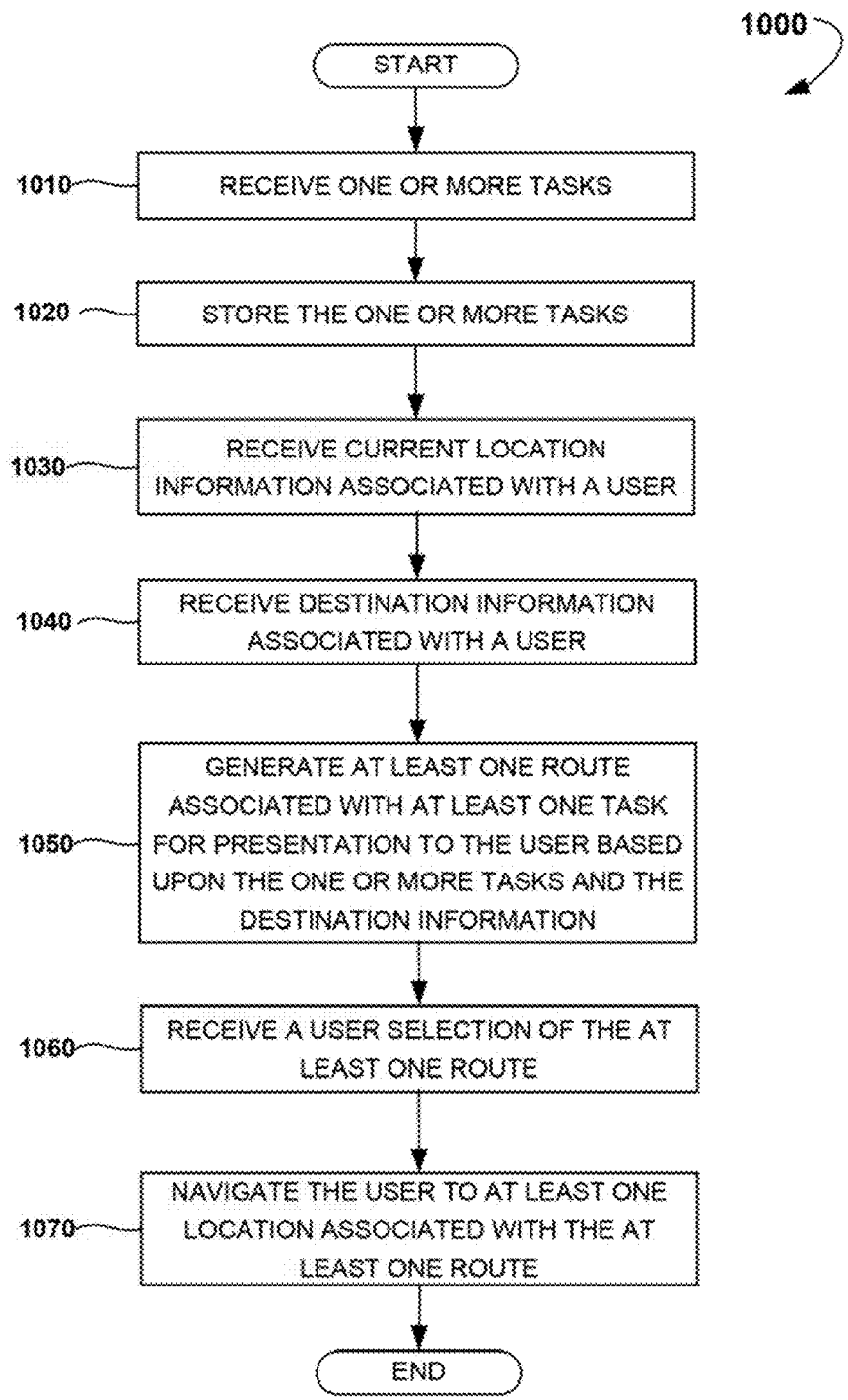
FIG. 10 is a process flow diagram showing a method for intelligent route planning, according to an example embodiment.

FIG. 10 is a process flow diagram showing a method 1000 for intelligent route planning, according to another example embodiment. The method 1000 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the system 800.

As shown in FIG. 10, at operation 1010, the wireless transmitter 810 or the input interface 830 may receive one or more tasks from one or more users. At operation 1020, the one or more tasks may be stored in the memory 860. At operation 1030, the wireless transmitter 810 or the input interface 830 may receive destination information associated with a user. At operation 1040, the one or more processors 820 may receive destination information associated with a user. At operation 1050, the one or more processors 820 may generate at least one route associated with at least one task for presentation to the user based upon the one or more tasks and the destination information. At operation 1060, the wireless transmitter 810 or the input interface 830 may receive a user selection of the at least one route. At operation 1070, the one or more processors 820 and/or the navigational unit 850 may navigate the user to at least one location associated with the at least one route.

Figure 11:
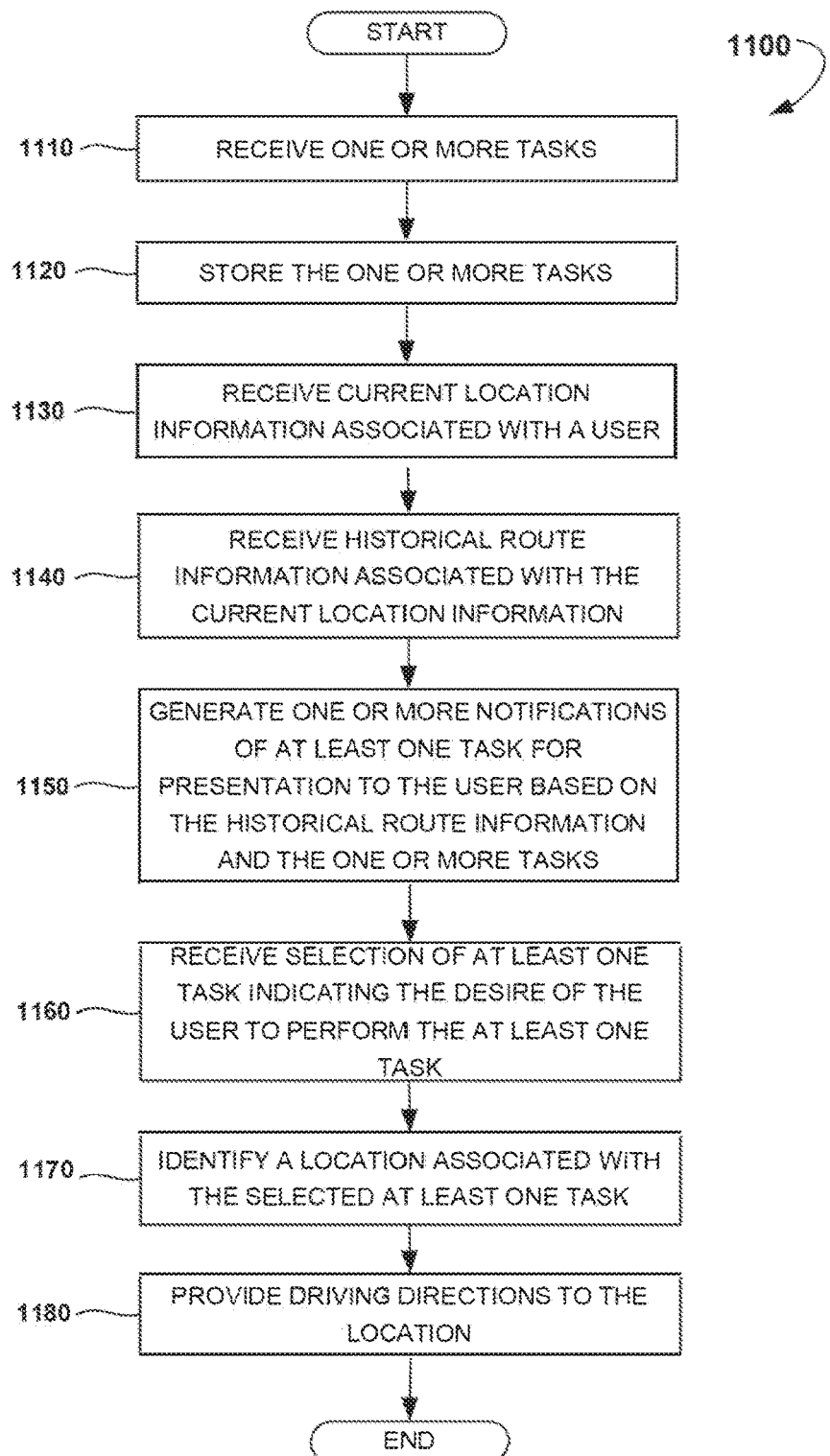
FIG. 11 is a process flow diagram showing a method for intelligent route planning according to an example embodiment.

FIG. 11 is a process flow diagram showing a method 1100 for intelligent route planning, according to yet another example embodiment. The method 1100 may be performed by processing logic that may comprise hardware (e.g., dedicated logic, programmable logic, and microcode), software (such as software run on a general-purpose computer system or a dedicated machine), or a combination of both. In one example embodiment, the processing logic resides at the system 800.

As shown in FIG. 11, at operation 1110, the wireless transmitter 810 or the input interface 830 may receive one or more tasks from one or more users. The one or more tasks may be associated with one or more locations. At operation 1120, the one or more tasks may be stored in the memory 860. At operation 1130, the wireless transmitter 810 or the navigational unit 850 may receive current location information associated with a user (or current location of the system 800). At operation 1140, the wireless transmitter 810 or the one or more processors 820 may receive historical route information associated with the current location information. At operation 1150, the one or more processors 820 may generate one or more notifications of at least one task for presentation to the user based on the historical route information and the one or more tasks. At operation 1160, the wireless transmitter 810 or the input interface 830 may receive a user selection of at least one task indicating the desire of the user to perform the at least one task. At operation 1170, the one or more processors 820 may identify a location associated with the selected at least one task. At operation 1180, the one or more processors 820 and/or the navigational unit 850 may provide driving directions to the location.

Certain embodiments of the present disclosure are described above with reference to block and flow diagrams of systems and methods and/or computer program products according to example embodiments of the present disclosure. It should be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the present disclosure.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the present disclosure may provide for a computer program product, comprising a computer-usable medium having a computer-read able program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block, diagrams and flow diagrams, and combinations of blocks in the block diagrams and flow diagrams, can be implemented by special-purpose, hardware-based computer systems that perform the specified functions, elements or steps, or combinations of special-purpose hard ware and computer instructions.

While certain embodiments of the present disclosure have been described in connection with what is presently considered to be the most practical and various embodiments, it is to be understood that the present disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

Certain embodiments of the present disclosure described herein may have the technical effect of enhancing user awareness of one or more tasks that are associated with one or more geographical locations. Further, certain embodiments of the present disclosure described herein may have the technical effect of enhancing flexibility and usability of how the user tasks can be implemented.

This written description uses examples to disclose certain embodiments of the present disclosure, including the best mode, and also to enable any person skilled in the art to practice certain embodiments of the present disclosure, including making and using any devices or systems and performing any incorporated methods. The patentable scope of certain embodiments of the present disclosure is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A computer-implemented method comprising:

receiving, by a computation system comprising one or more processors, at least one task;

storing, by the computation system, the at least one task receiving, by a Global Position System (GPS) receiver, associated with the computation system, current location information associated with a user device based on a current route, wherein the current location information is based at least in part on one or more of:

GPS data,
multilateration information associated with the user device, or
an internet address of the user device;
determining, by the computation system, a location associated with the at least one task;
determining, by the computation system, that the at least one task is associated with a user of the user device, by authenticating the user based at least in part on one or more biometric data inputs, wherein the one or more biometric data inputs are associated with at least one of an electrical resistance, an electrical parameter, or an electromagnetic parameter associated with the user of the user device;
generating, by the computation system, a recommendation for one or more routes associated with the at least one task, based on historical route information;
prioritizing, by the computation system, the at least one task, wherein a higher priority indicates a more urgent task;
listing, by the computation system, the one or more routes, based on the prioritization of the at least one task;
determining, by the computation system, that the location associated with the at least one task is within a predetermined range of the current route;
generating, by the computation system, one or more notifications of the at least one task for presentation to the user device, based on the at least one task and the current location information;
providing, by the computation system, driving directions to the location associated with the at least one task;
receiving, by the computation system, profile information related to at least one occupant of a vehicle associated with the computation system;
identifying, by the computation system, the at least one occupant; and
authorizing, by the computation system, the at least one occupant to perform the at least one task.

2. The method of claim 1, wherein the one or more notifications are further based on a direction of travel associated with the user device.

3. The method of claim 1, wherein the notifications are generated on a display associated with the computation system.

4. The method of claim 1, wherein:
the user device is a mobile device, and the notifications are generated on a display of the user device, and
the user device is wirelessly connected to the computation system.

5. The method of claim 1, wherein the notifications are sent to the user device wirelessly connected to the computation system.

6. The method of claim 1, wherein the notifications include one or more of an audible reminder, a digital message, an audible signal, a visual signal, and a mechanical signal.

7. The method of claim 1, further comprising:
identifying, by the computation system, a location associated with the at least one task; and
providing, by the computation system, driving directions to the location.

8. The method of claim 1, wherein the at least one task is received from one or more devices associated with the at least one task.

9. The method of claim 1, wherein the at least one task is received from one or more user devices associated with the at least one task.

10. The method of claim 9, further comprising:
determining by the computation system, that the at least one task is completed; and
based on the determination, informing the one or more user devices that the at least one task is completed.

11. The method of claim 1, wherein the at least one task is received by the computation system from a wireless communication device associated with the user device.

12. The method of claim 1, wherein the at least one task is received from a central server over at least one wireless communications network.

13. The method of claim 1, wherein the one or more notifications are further based on a completion date associated with the at least one task.

14. A computer-implemented method comprising:
receiving, by a computation system comprising one or more processors, at least one task from one or more user devices;
storing, by the computation system, the at least one task;
receiving, by a Global Position System (GPS) receiver, associated with the computation system, current location information of a user device, wherein the current location information is based at least in part on one or more of:
GPS data,
multilateration information associated with the user device, or
an internet address of the user device;
determining, by the computation system, that the at least one task is associated with a user associated with the user device, by authenticating the user, based at least in part on one or more biometric data inputs, wherein the one or more biometric data inputs are associated with at least one of an electrical resistance, an electrical parameter, or an electromagnetic parameter associated with the user of the user device;
receiving, by the computation system, destination information associated with the user device based on a current route, wherein the destination information is based at least in part on one or more of:
GPS data associated with the destination of the user device, or
multilateration information associated with the destination of the user device;
generating, by the computation system, a recommendation for at least one route associated with the at least one task, based on historical route information;
prioritizing, by the computation system, the at least one task, wherein a higher priority indicates a more urgent task;
listing, by the computation system, the at least one route, based on the prioritization of the at least one task;
determining, by the computation system, a location associated with the at least one task;
determining, by the computation system, that the location associated with the at least one task is within a predetermined range of the current route;
generating, by the computation system, one or more notifications of the at least one task for presentation to the user device, based on the at least one task and the current location information;
determining, by the computation system, a location associated with the at least one task;

providing, by the computation system, driving directions to the location associated with the at least one task;
receiving, by the computation system, profile information related to at least one occupant of a vehicle associated with the computation system;
identifying, by the computation system, the at least one occupant; and
authorizing, by the computation system, the at least one occupant to perform the at least one task.

15. The method of claim 14, further comprising:
prompting the user device, by the computation system, to select the at least one route;
receiving, by the computation system, a selection from the user device of the at least one route;
navigating by the computation system the user device to at least one location associated with the at least one route; and
upon completion of the at least one task, notifying at least one user device, of the one or more user devices, associated with the at least one task.

16. The method of claim 14, wherein the generation of the at least one route is further based upon traffic information.

17. A computer-implemented method comprising:
receiving, by a computation system comprising one or more processors, at least one task from one or more user devices, wherein the at least one task is associated with one or more locations, and a determination of the one or more locations is based at least in part on one or more of:
Global Positioning System (GPS) data, received by a GPS receiver,
wherein the GPS data is associated with the computation system,
multilateration information associated with the one or more user devices, or
an internet address of the one or more user devices;
storing, by the computation system, the at least one task;
receiving, by the computation system, current location information of a user device, wherein the current location information is based at least in part on one or more of:
current GPS location data,
current multilateration information associated with the user device, or
a current internet address of the user device;
determining, by the computation system, a location associated with the at least one task;
determining, by the computation system, that the at least one task is associated with a user associated with the user device, by authenticating the user based at least in part on one or more biometric data inputs, wherein the biometric data inputs are associated with at least one of an electrical resistance, an electrical parameter, or an electromagnetic parameter associated with the user of the user device;
receiving, by the computation system, historical route information associated with the current location information, wherein the historical location information is based at least in part on one or more of:
historical GPS data,
historical multilateration information associated with the one or more user devices or the user device, or
a historical internet address of the one or more user devices or the user device;
generating, by the computation system, a recommendation for one or more routes associated with the at least one task, based on the historical route information;
prioritizing, by the computation system, the at least one task, wherein a higher priority indicates a more urgent task;
listing, by the computation system, the one or more routes, based on the prioritization of the at least one task;
determining, by the computation system, that the location associated with the at least one task is within a predetermined range of the current route;
generating one or more notifications of at least one task for presentation to the user device, based on the historical route information and the at least one task;
providing, by the computation system, driving directions to the location of the at least one task;
receiving, by the computation system, profile information related to at least one occupant of a vehicle associated with the computation system;
identifying, by the computation system, the at least one occupant; and
authorizing, by the computation system, the at least one occupant to perform the at least one task.

18. The method of claim 17, wherein the historical route information is based on a current time.

19. The method of claim 17, wherein the computation system includes an in-vehicle infotainment system.

20. A system comprising:
a computation device comprising one or more processors, the one or more processors configured to:
receive at least one task associated with one or more locations, wherein a determination of the one or more locations is based at least in part on one or more of:
Global Positioning System (GPS) data, received from a GPS receiver,
multilateration information, or
an internet address;
store the at least one task;
receive current location information associated with a user device based on a current route, wherein the current location information is based at least in part on one or more of:
current GPS data,
current multilateration information associated with the user device, or
a current internet address of the user device;
determining, by the computation system, a location associated with the at least one task;
determine that the at least one task is associated with a user associated with the user device, by authenticating the user based at least in part on one or more biometric data inputs, wherein the one or more biometric data inputs are associated with at least one of an electrical resistance, an electrical parameter, or an electromagnetic parameter of the user of the user device;
generate a recommendation for one or more routes associated with the at least one task, based on historical route information;
prioritize the at least one task, wherein a higher priority indicates a more urgent task;
list the one or more routes, based on the prioritization of the at least one task;
generate one or more notifications of the at least one task for presentation to the user device, based upon the at least one task and the current location information;

determine that the location associated with the at least one task is within a predetermined range of the current route;

provide the user device with a modified route including at least one route to the location associated with the at least one task;

receive a selection from the user device of the at least one route to the location associated with the at least one task;

navigate the user device to the location associated with the at least one task on the modified route;

receive profile information related to at least one occupant of a vehicle associated with the computation system;

identify the at least one occupant;

authorize the at least one occupant to perform the at least one task; and upon completion of the at least one task, notify one or more user devices of the completion of the at least one task, wherein each of the one or more user devices has an association with each of the one or more locations.

21. A non-transitory processor-readable medium having embodied thereon instructions being executable by at least one processor to perform a method comprising:

receiving, by a computation system comprising one or more processors, at least one task;

storing, by the computation system, the at least one task;

receiving, by the computation system, current location information associated with a user device based on a current route, wherein the current location information is based at least in part on one or more of:

current Global Positioning System (GPS) data, received from a GPS receiver, current multilateration information associated with the user device, or a current internet address of the user device;

determining, by the computation system, a location associated with the at least one task;

determining, by the computation system, that the at least one task is associated with a user associated with the user device, by authenticating the user based at least in part on one or more biometric data inputs, wherein the one or more biometric data inputs are associated with at least one of an electrical resistance, an electrical parameter, or an electromagnetic parameter of the user of the user device;

determining, by the computation system, at least one task of the at least one task is within a predetermined range of the current route;

generating, by the computation system, a recommendation for one or more routes associated with the at least one task, based on historical route information;

prioritizing, by the computation system, the at least one task, wherein a higher priority indicates a more urgent task;

listing, by the computation system, the one or more routes, based on the prioritization of the at least one task;

determining, by the computation system, that the location associated with the at least one task is within a predetermined range of the current route;

generating, by the computation system, one or more notifications of the at least one task for presentation to the user device, based upon the at least one task and the current location information;

providing, by the computation system, driving directions to the location associated with the at least one task;

receiving, by the computation system, profile information related to at least one occupant of a vehicle associated with the computation system;

identifying, by the computation system, the at least one occupant; and authorizing, by the computation system, the at least one occupant to perform the at least one task.

* * * * *